US006349834B1

(12) United States Patent
Carr et al.

(10) Patent No.: US 6,349,834 B1
(45) Date of Patent: Feb. 26, 2002

(54) VIBRATORY SCREEN SEPARATOR

(75) Inventors: Brian S. Carr, Ft. Wright; Ari M. Hukki; Eric K. Johnson, Jr., both of Edgewood, all of KY (US)

(73) Assignee: M-I, L.L.C., Houston, TX (US)

( * ) Notice: Subject to any disclaimer, the term of this patent is extended or adjusted under 35 U.S.C. 154(b) by 0 days.

(21) Appl. No.: 09/597,369

(22) Filed: Jun. 19, 2000

Related U.S. Application Data

(62) Division of application No. 09/061,494, filed on Apr. 17, 1998, now abandoned.

(51) Int. Cl.[7] ............................ B07B 1/44; F16H 33/14

(52) U.S. Cl. ........................ 209/366.5; 209/367; 74/61; 74/87; 366/128

(58) Field of Search .............................. 209/364, 365.1, 209/366, 366.5, 367; 198/750.1, 751, 770; 74/61, 87; 366/128

(56) References Cited

U.S. PATENT DOCUMENTS

| | | | | | |
|---|---|---|---|---|---|
| 3,442,381 | A | | 5/1969 | Johnson | 209/326 |
| 3,666,095 | A | | 5/1972 | Krynock et al. | 209/254 |
| 3,929,642 | A | | 12/1975 | Ennis et al. | 210/113 |
| 3,948,109 | A | | 4/1976 | Elonen | 74/61 |
| 3,954,604 | A | | 5/1976 | Krause et al. | 209/325 |
| 4,152,255 | A | | 5/1979 | Musschoot | 209/234 |
| 4,165,655 | A | | 8/1979 | Alford | 74/61 |
| 4,170,549 | A | | 10/1979 | Johnson | 209/363 |
| 4,274,953 | A | | 6/1981 | Jackson | 209/326 |
| 4,340,469 | A | | 7/1982 | Archer | 209/315 |
| 4,402,826 | A | | 9/1983 | Uchitel et al. | 209/366.5 |
| 4,582,597 | A | | 4/1986 | Huber | 204/313 |
| 4,632,751 | A | | 12/1986 | Johnson et al. | 209/326 |
| 4,911,834 | A | | 3/1990 | Murphy | 210/167 |
| 5,051,171 | A | | 9/1991 | Hukki | 209/323 |
| 5,064,053 | A | | 11/1991 | Baker | 198/770 |
| 5,067,358 | A | | 11/1991 | Ancrenaz | 209/367 |
| 5,131,525 | A | | 7/1992 | Musschoot | 198/770 |
| 5,220,846 | A | * | 6/1993 | Niklewski | 74/87 |
| 5,265,730 | A | | 11/1993 | Norris et al. | 209/326 |
| 5,443,163 | A | | 8/1995 | Mogensen | 209/315 |
| 5,584,375 | A | * | 12/1996 | Burgess, Jr. et al. | 198/751 |
| 5,615,763 | A | | 4/1997 | Schieber | 198/770 |
| 5,666,852 | A | * | 9/1997 | Musschoot | 209/366.5 X |
| 5,683,580 | A | | 11/1997 | Young | 210/385 |

FOREIGN PATENT DOCUMENTS

| | | | | |
|---|---|---|---|---|
| WO | 93/24245 | * | 12/1993 | 209/367 |

* cited by examiner

*Primary Examiner*—Tuan N. Nguyen
(74) *Attorney, Agent, or Firm*—Lyon & Lyon LLP

(57) ABSTRACT

A vibratory screen separator having a resiliently mounted frame with a screen mounting to receive screens for material flow thereacross. Eccentric weight systems are rotationally mounted with effective axes of eccentric force coincident. The weight systems are symmetrical about a center plane through the separator for uniform vibration thereacross. The coincident axes extend through the center of gravity. A drive is coupled with both weight systems such that the direction of rotation of the weight systems are opposite to one another in one embodiment and opposite in another.

7 Claims, 7 Drawing Sheets

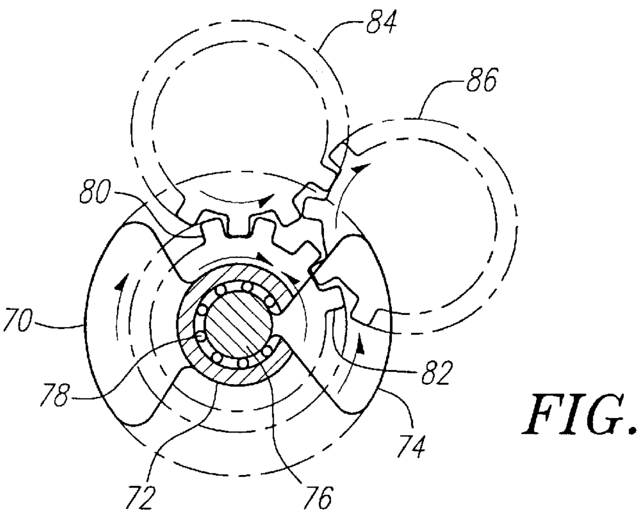
FIG. 6
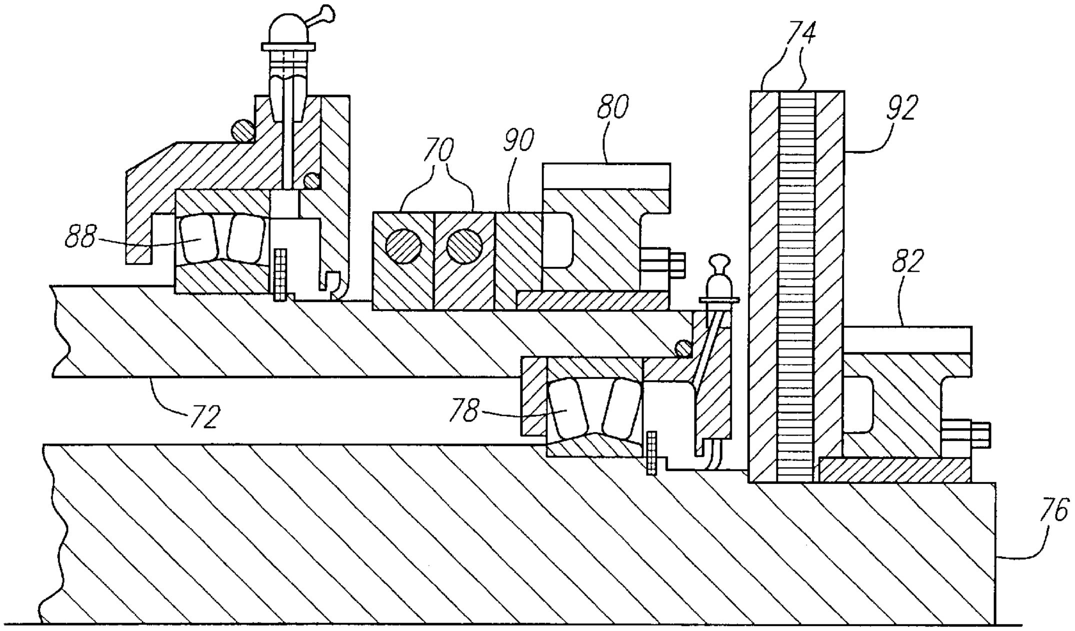
FIG. 7
FIG. 8
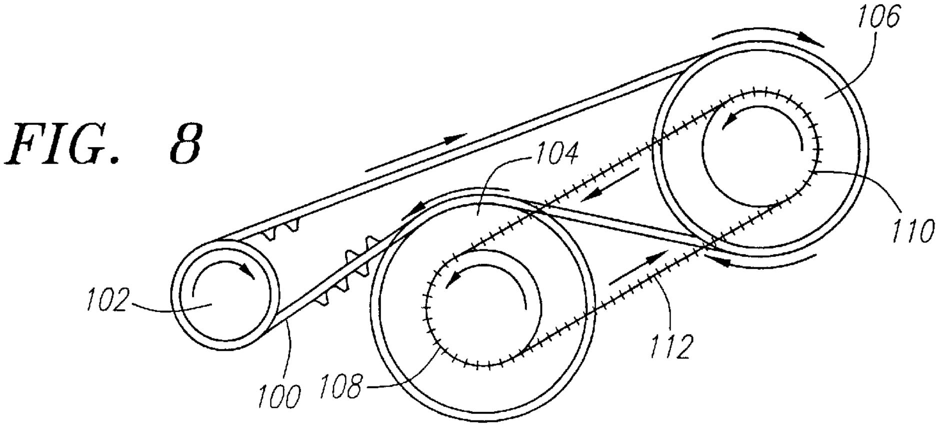

VIBRATORY SCREEN SEPARATOR

This is a divisional application of U.S. patent application Ser. No. 09/061,494, filed Apr. 17, 1998, now abandoned.

BACKGROUND OF THE INVENTION

The field of the present invention is screen separators using vibratory motion to enhance separation.

Separation, sifting and the like through screens have long been accomplished with the assistance of vibratory motion. Such motion has been used as a means for vibrating the screens through which material is to pass, thereby using inertia and particle interaction of the material itself in assisting it through the screen, reducing screen blinding effects and physically breaking up clumps of material to improve screening efficiency. Such vibration also can be used as a means for advancing material along a surface. In screening, advancement and screening are both enhanced by vibratory motion. One such screen device is disclosed in U.S. Pat. No. 5,265,730, the disclosure of which is incorporated herein by reference. Another is disclosed in U.S. Pat. No. 4,582,597, the disclosure of which is incorporated herein by reference. Also in screening, vibratory motion can be used to cause impacts by the screen with solid elements positioned adjacent the screen for additional cleaning efforts. Reference may be made to U.S. Pat. No. 5,051,171, the disclosure of which is incorporated herein by reference.

A plurality of motions have been commonly used for the screening of materials. Round motion may be generated by a simple eccentric weight located roughly at the center of gravity of a resiliently mounted screening device with the rotational axis extending perpendicular to the vertical symmetrical plane of the separator. Such motion is considered to be excellent for particle separation and excellent for screen life. It requires a very simple mechanism, a single rotationally driven eccentric weight. However, round motion acts as a very poor conveyor of material and becomes disadvantageous in continuous feed systems where the oversized material is to be continuously removed from the screen surface. Machines are also known with two parallel axes of eccentric rotation extending perpendicular to the symmetrical plane.

Another common motion is achieved through the counter rotation of adjacent eccentric vibrators also affixed to a resiliently mounted screening structure. Through the orientation of the eccentric vibrators at an angle to the screening plane, linear vibration may be achieved at an angle to the screen plane. Such inclined linear motion has been found to be excellent for purposes of conveying material across the screen surface. However, it has been found to be relatively poor for purposes of separation and is very hard on the screens.

Another motion commonly known as multi-direction elliptical motion is induced where a single rotary eccentric vibrator is located at a distance from the center of gravity of the screening device. This generates elliptical motions in the screening device. However, the elliptical motion of any element of the screen has a long axis passing through the axis of the rotary eccentric vibrator. Thus, the motion varies across the screening plane in terms of direction. This motion has been found to produce efficient separation with good screen life. As only one eccentric is employed, the motion is simple to generate. However, such motion is very poor as a conveyor.

Another motion similar to the counter rotation of adjacent eccentric vibrators is illustrated in U.S. Pat. No. 5,265,730. Uni-directional elliptical motion is generated through the placement of two rotary eccentric vibrators with the axes of the vibrators similarly inclined from the vertical away from the direction of material travel and oppositely inclined from the vertical in a plane perpendicular to the direction of material travel. The inclination of the large axis of the elliptical motion relative to the screen surface is controlled by the inclination of the rotary eccentric vibrators away from the intended direction of travel of the material on the screen surface. The inclination of the vibrators in a plane perpendicular to the intended direction of material travel varies the width of the ellipse. These devices have been found to require substantial frame structures to accommodate the opposed forces imposed upon the frame.

In reviewing the motions typically associated with rectangular screening devices, compromises are inevitable. One typically must choose among strengths and weaknesses in conveying capability, screening capability and screen life.

SUMMARY OF THE INVENTION

The present invention is directed to a vibratory screen separator having a versatile vibration generating system which does not place large opposed forces on the overall frame structure.

In a first separate aspect of the present invention, a resiliently mounted frame rotationally mounts two eccentric weight systems. These eccentric weight systems include axes of eccentric force which are coincident with one another. Each of the weight systems is symmetrical about a center plane of the resiliently mounted frame, that center plane being parallel to the direction of material travel and normal to the plane of the screen mounting on the resiliently mounted frame. A drive system rotates the eccentric weights of the systems to effect coincident axes.

In a second separate aspect of the present invention, the device of the first aspect may assume a particularly preferred configuration with the eccentricities of the systems being unequal and the ratio of the speeds between systems being constant. With coincident effective axes, the eccentric weight systems may be located at the center of gravity of the frame.

In a third separate aspect of the present invention, a vibratory screen separator includes a resiliently mounted frame to which two eccentric weights are rotationally mounted about coincident axes. The weights are driven in opposite directions and are each symmetrical about the center plane identified in the first aspect.

In a fourth separate aspect of the present invention, any of the foregoing aspects may further include particular features such as coincident effective axes of eccentric force, operation at the center of gravity of the frame, variations in eccentricity between eccentrics and phase orientation of the eccentric weights to define and orient elliptical motion. Drive systems capable of phase adjustment are also contemplated.

In a fifth separate aspect of the present invention, various combinations of the foregoing aspects are contemplated to provide system advantage.

Accordingly, it is an object of the present invention to provide improved vibratory screen separator motion. Other and further objects and advantages will appear hereinafter.

BRIEF DESCRIPTION OF THE DRAWINGS

FIG. 6 is a schematic side view of a second embodiment with coaxial rotationally mounted eccentric weights.

FIG. 7 is a cross-sectional view of the rotational mounting and drive of the device of FIG. 6.

FIG. 8 is a side view of a belt drive system for the second embodiment.

DETAILED DESCRIPTION OF THE PREFERRED EMBODIMENTS

Figure 1:
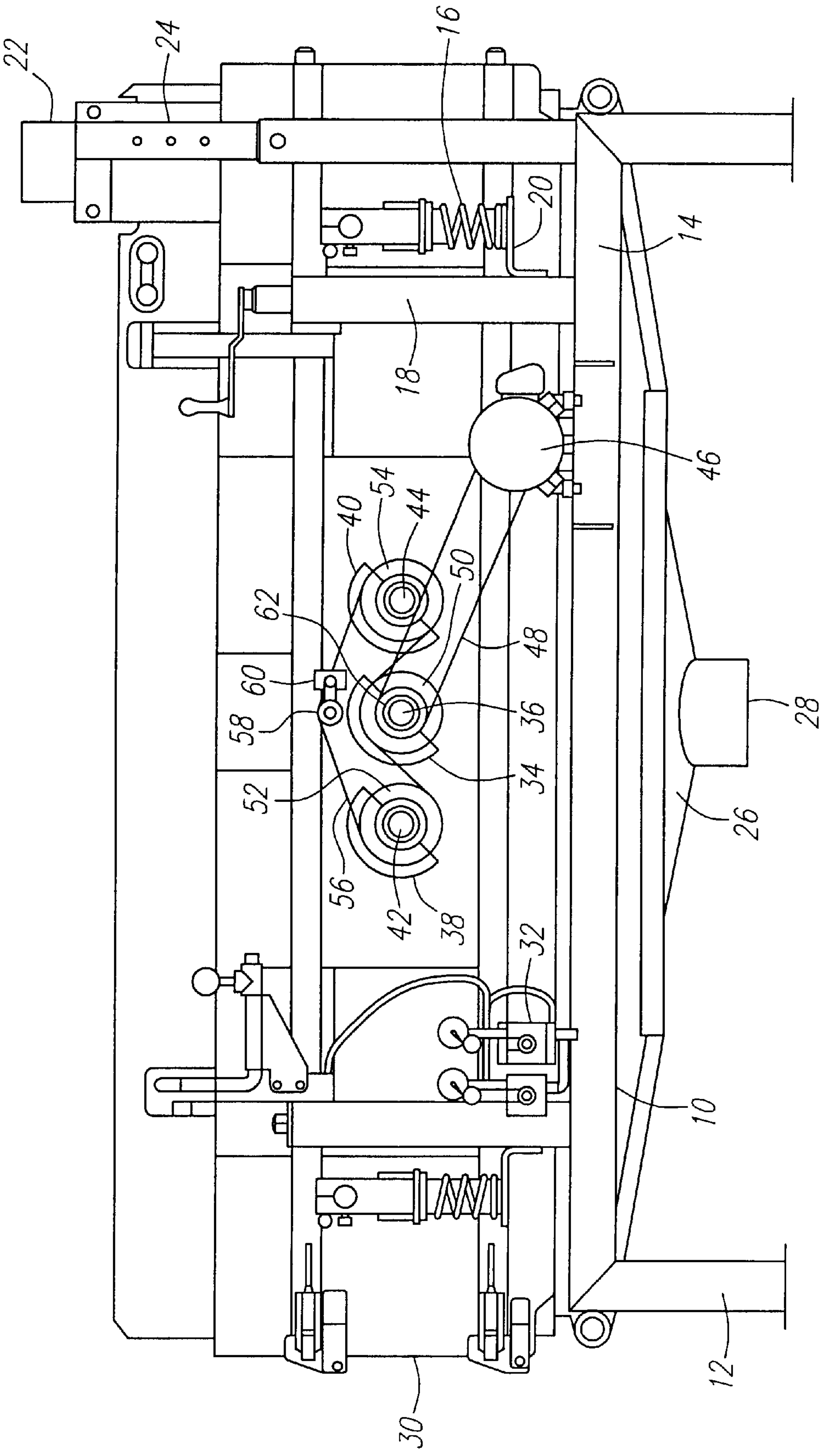
FIG. 1 is the side view of a vibratory screen separator with the first embodiment of a vibration system.

Turning in detail to the drawings, FIG. 1 illustrates a vibratory screen separator. The separator includes a base 10 having four legs 12 and a rectangular structure 14. Resilient mounts 16 are supported on the base 10 through posts 18 and angle brackets 20. An inlet manifold 22 is also supported on the base 10 by two supports 24. A collector pan 26 is fixed to the base 10 within the rectangular structure 14 to collect material passing through the separator screen. The collector pan 26 includes a discharge port 28.

Figure 2:
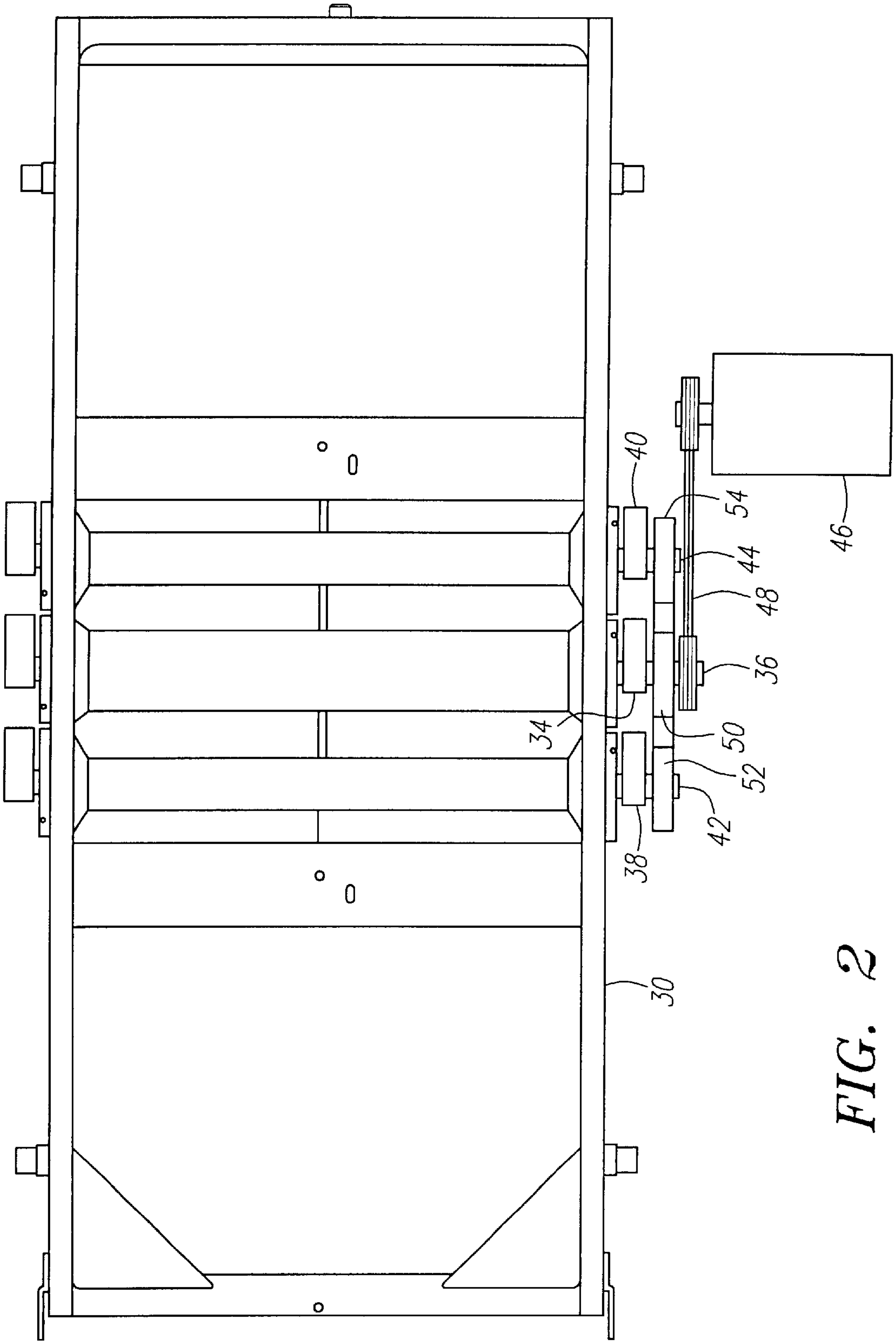
FIG. 2 is a plan view of the resiliently mounted frame of FIG. 1.

A frame 30 is resiliently mounted to the base 10 through the four resilient mounts 16. The frame 30 is generally rectangular in plan as illustrated in FIG. 2 without a bottom and with the discharge end of the frame open. Within the frame 30, a screen mounting is fixed to define a first plane onto which screens are fixed. Reference is made to U.S. Pat. No. 5,051,171 for one such screen mounting configuration. A source of air 32 is mounted to the base 10 and extends to inflate the pneumatic seals. With the inlet manifold 22 at one end of the separator above the plane of the screen mounting and the discharge end of the frame 30 being open, the direction of material travel on the screens mounted in the plane is from the manifold end to the open discharge end.

A vibration generating system is mounted to the sides of the frame 30. A first embodiment is illustrated in various states in FIGS. 1 through 5. A first eccentric weight system forms part of the vibration generating system and includes an eccentric weight 34 rotationally mounted to the frame 30 on a shaft defining an axis of rotation 36. The eccentric weight 34 is preferably made up of two weight elements which are symmetrically placed to either side of a center plane defined within the frame. The plane is parallel to the direction of material travel and normal to the screen mounting plane. The shaft defining the axis 36 may extend fully through the frame 30 and be mounted on bearings or bushings. The weight elements of the eccentric weight 34 are keyed to the shaft at the same angular position. The axis 36 is positioned in this embodiment to pass through the center of gravity of the frame 30. Where room is at a premium, eccentric weighted shafts may be used to reduce the size and throw of the weight elements. Each rotating assembly constitutes an eccentric weight for purposes here.

Another eccentric weight system is defined by two eccentric weights 38 and 40. Two shafts define axes 42 and 44 about which the eccentric weights 38 and 40 rotate. These weights 38 and 40 are also made up of weight elements symmetrically positioned to either side of the frame 30 about the center plane as was true of the eccentric weight 34. The shafts defining the axes 42 and 44 may extend fully through the frame to mount the two elements of the eccentric weights 38 and 40. Alternatively, the shafts associated with the axes 36, 42 and 44 may not extend fully across the frame 30. In such a circumstance, timing through a shaft extending fully across the frame 30 or through phase control of the drive system is appropriate for maintaining a symmetrical eccentric weight system.

A drive is associated with the eccentric weights 34, 38 and 40 through the shafts defining the axes 36, 42 and 44. A motor 46 is mounted to the rectangular structure 14 of the base 10. A second motor may be positioned on the other side of the frame 30 if rotational power is not provided through the shafts associated with one or more of the eccentric weights 34, 38 and 40. The motor 46 is displaced from the eccentric weights in order that a drive belt 48 can accommodate the relative motion of the vibratory frame 30 and the fixed base 10. Where a shaft extends across the frame 30 to insure timing between elements of the eccentric weights 34, 38 and 40, timing is unnecessary between the motor 46 and the weights. Consequently, the drive belt 48 may be a V-belt associated with pulleys, one on the motor 46 and the other on the shaft associated with the eccentric weight 34.

Toothed pulleys are provided with each of the shafts defining the axes 36, 42 and 44. These pulleys 50, 52 and 54 are keyed to the shafts such that they are angularly fixed relative to the weights 34, 38 and 40. A toothed timing belt 56 extends around the pulleys 50, 52 and 54 as illustrated in each of FIGS. 1 through 5. A similar toothed timing belt 56 may be associated with the other side of the frame 30 if the shafts defining each of the axes 36, 42 and 44 does not extend fully through the frame 30 to mount the elements of each of the eccentric weights 34, 38 and 40. The toothed timing belt 56 has teeth on both sides so as to accommodate the eccentric weights 38 and 40 on one side of the belt and the eccentric weight 34 on the other. Because of the toothed timing belt 56, fixed ratios of rotation between the eccentric weights 34, 38 and 40 are defined. In the preferred embodiment, the pulleys 50, 52 and 54 have equal diameters. Consequently, the ratios of rotation are to unity.

A tensioning roller 58 is shown to extend from a support 60 by a pivotally mounted arm 62. The arm pivots about the support 60 while the roller 58 is rotationally mounted to the end of the arm 62. Through pivoting of the arm 62, the timing belt 56 may be alternately tensioned and released for operation and eccentric weight phase adjustment, respectively. The pivotally mounted arm 62 may also be spring biased to insure appropriate tensioning on the timing belt 56.

In the embodiment of FIGS. 1 through 5, the shafts defining the axes 36, 42 and 44 are parallel and lie in a common plane. This plane is shown to be parallel to the screen mounting plane. The axes 42 and 44 are shown to be equidistant to either side of the axis 36. The timing belt 56 arranged as illustrated in the Figures drives the central eccentric weight 34 in the opposite direction to the eccentric weights 38 and 40. Consequently, the eccentric weights 38 and 40 define an effective axis of eccentric force which is parallel to the effective axis of eccentric force of the eccentric weight 34. If the eccentric weights 38 and 40 have equal eccentricities, typically defined by equal weights and equal throws, the effective axis of eccentric force is coincident with the effective axis of eccentric force of the eccentric weight 34. By moving the outer weights 38 and 40 or changing the relative eccentricities therebetween, the effective axis of eccentric force of the weight pair is shifted along the plane in which the axes 36, 42 and 44 lie. By moving either or both of the effective axes of eccentric force from the center of gravity, vibration in the screen mounting plane will vary between the inlet end and the outlet end.

Figure 3A:
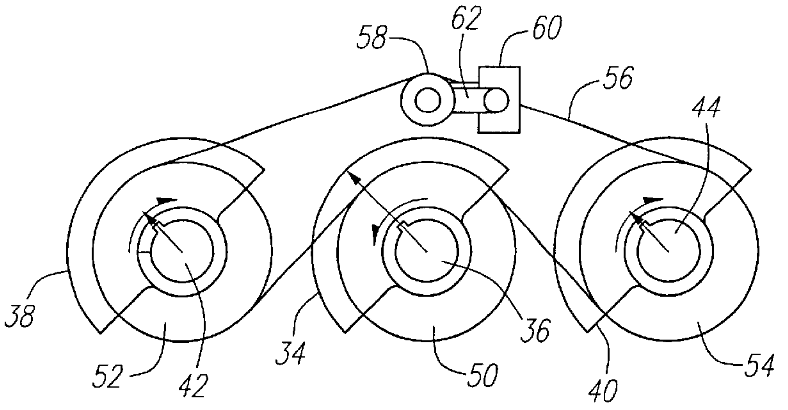
FIG. 3 is a series of schematic side views of the vibration system of FIG. 1 with eccentric weights in progressive positions throughout a rotational cycle.
Figure 3B:
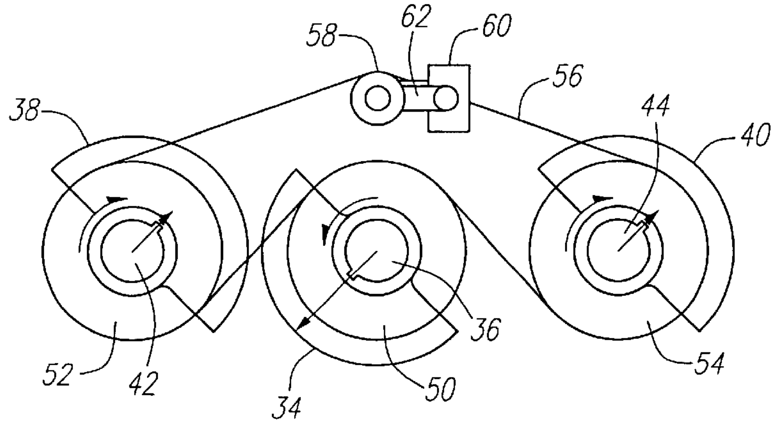
Figure 3C:
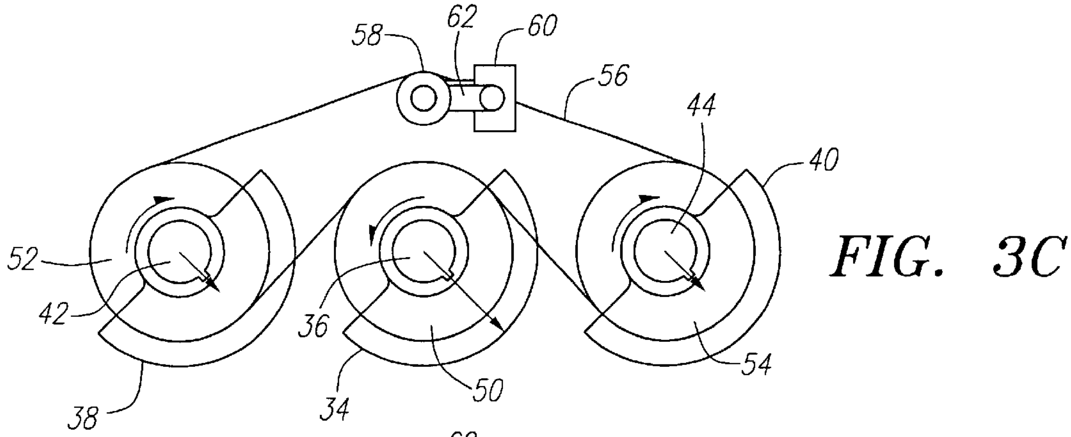
Figure 3D:
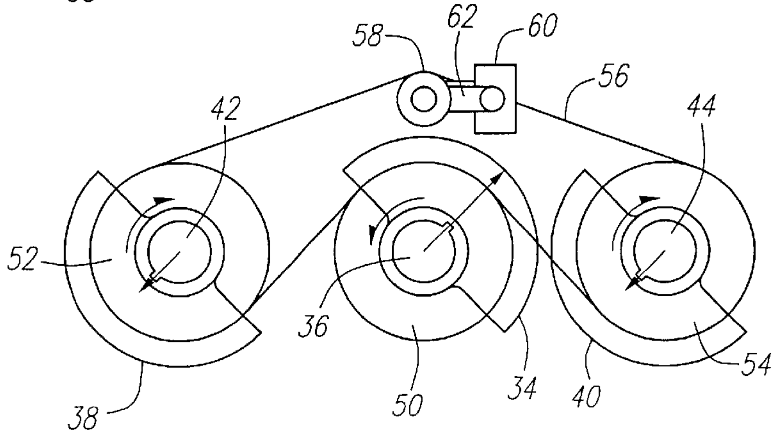
Figure 4A:
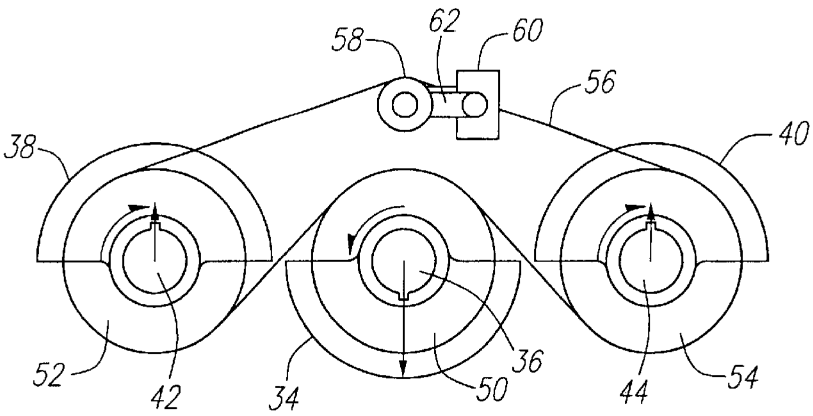
FIG. 4 is a series of schematic side views of the device of FIG. 3 with the phase of the eccentric weights in a second configuration.
Figure 4B:
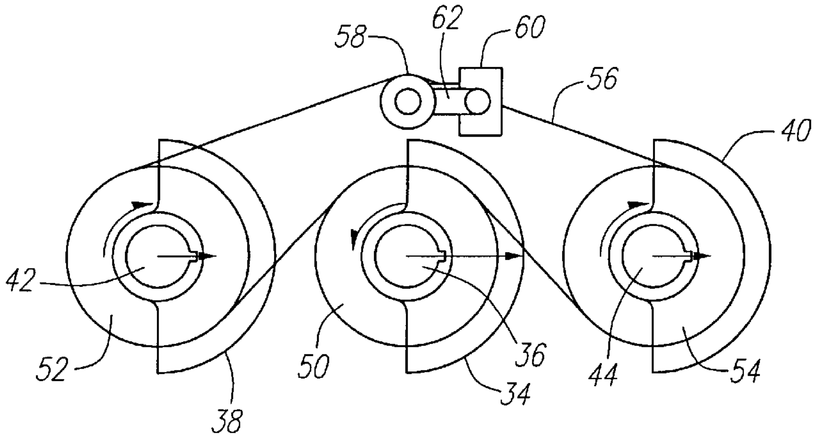
Figure 4C:
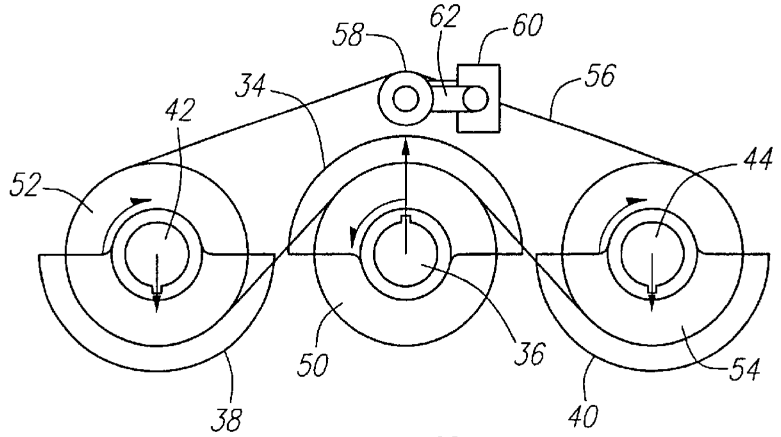
Figure 4D:
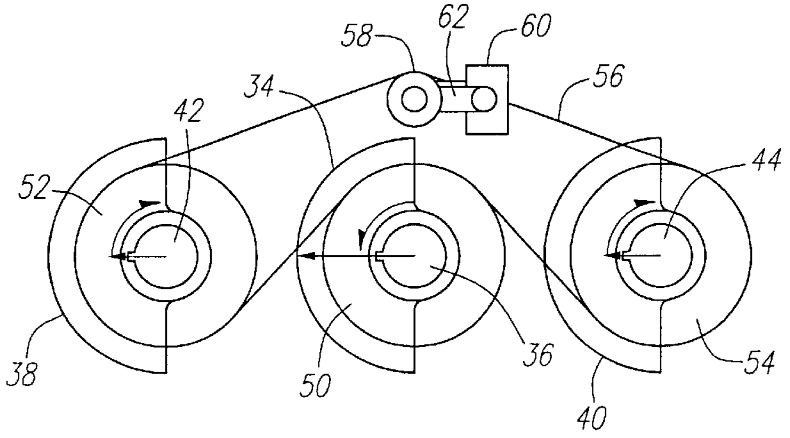
Figure 5A:
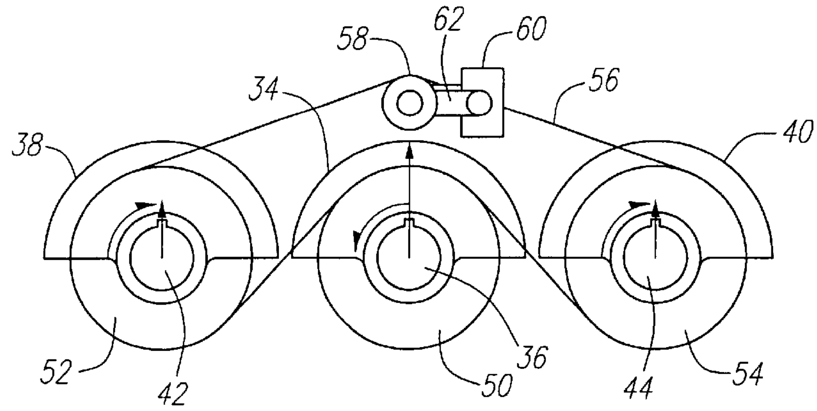
FIG. 5 is a series of schematic side views of the device of FIG. 3 with the phase of the eccentric weights in a third configuration.
Figure 5B:
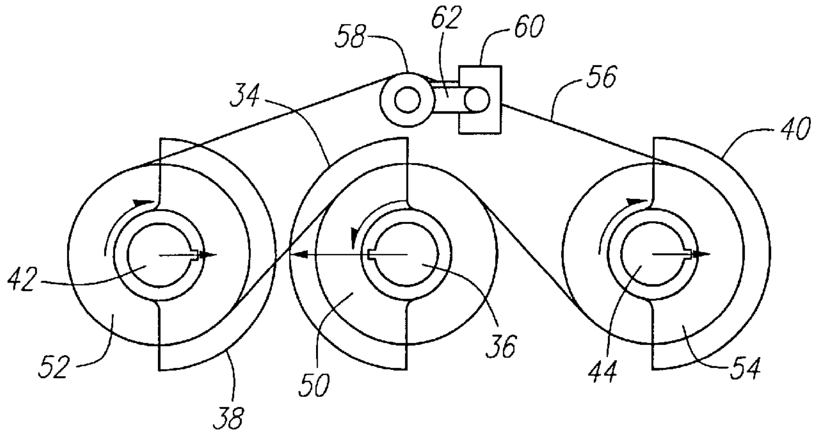
Figure 5C:
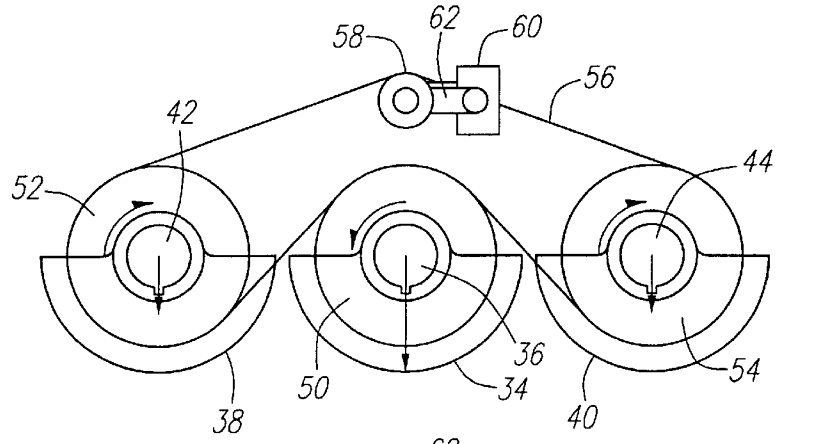
Figure 5D:
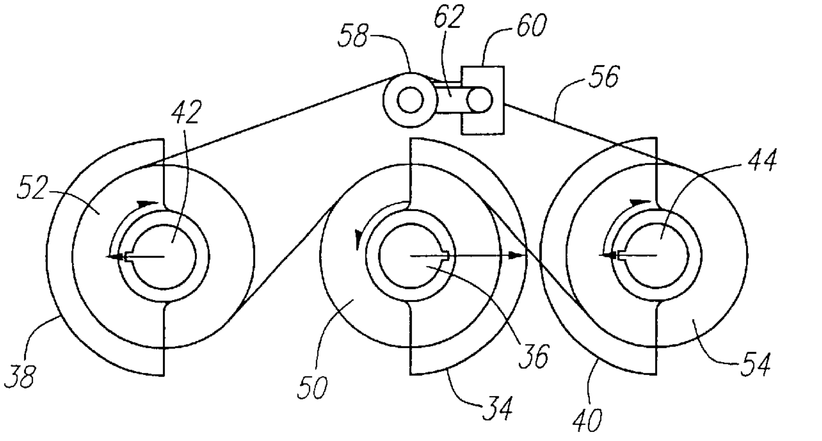
Figure 9A:
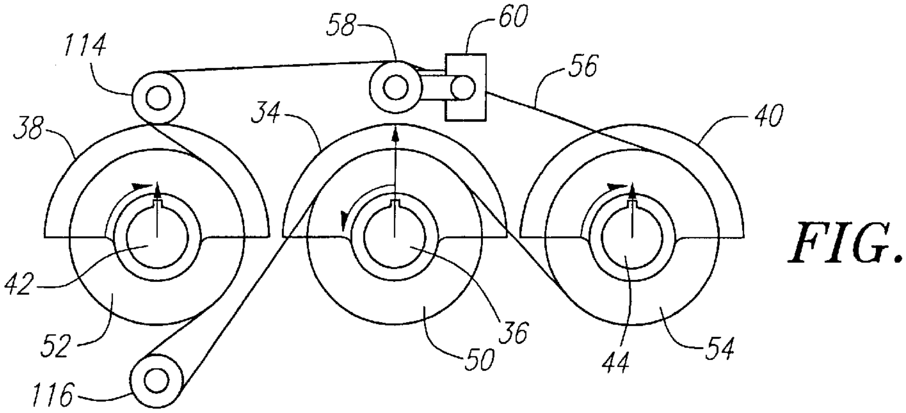
FIG. 9 is a series of schematic side views of the device of FIG. 3 with a second drive system.
Figure 9B:
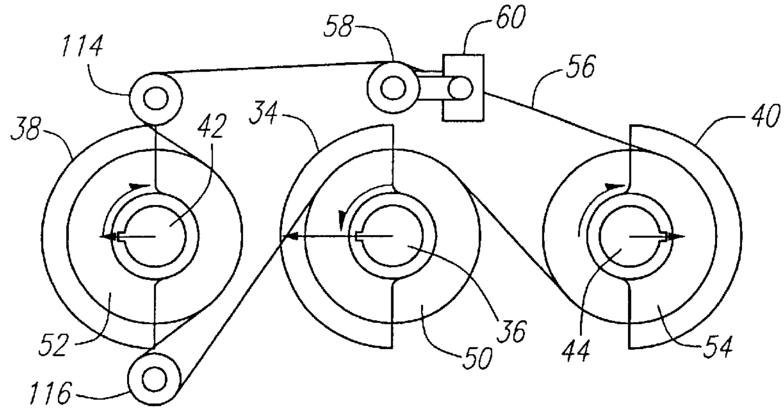
Figure 9C:
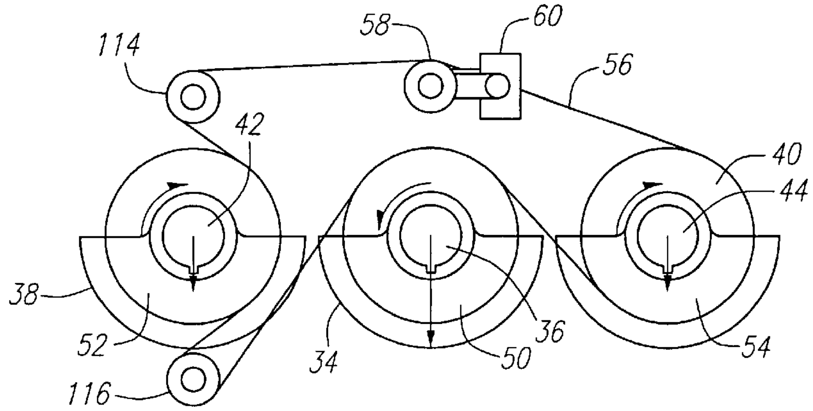
Figure 9D:
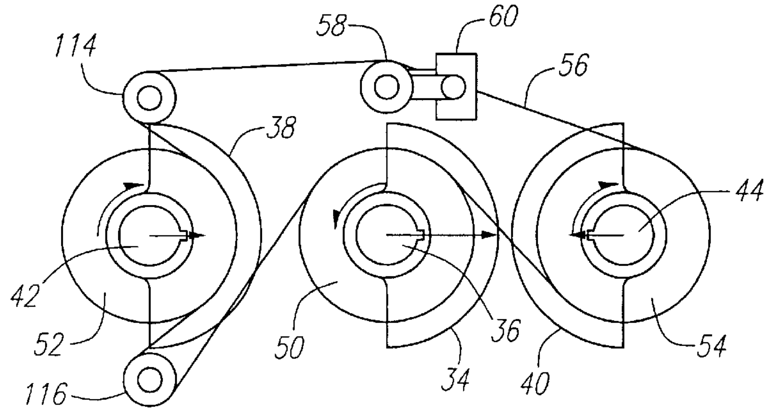

The relative phase of the eccentric weights 34, 38 and 40 may be varied to establish different motions. In FIG. 3, a first full cycle of rotation is illustrated in the successive views. The fixed ratios of rotation between the eccentric weights 34, 38 and 40 are equal to unity. Further, the weights 34, 38 and 40 are shown in FIG. 3A to be angularly aligned with the eccentricity inclined to the screen mounting plane toward the separator outlet. This results in maximum force under the influence of the aligned eccentric weights. FIG. 3B illustrates the position of minimum force. If, for example, the eccentric weights and their eccentricities are equal, the influence of the eccentric weights 38 and 40 dominates. Consequently, an elliptical path of motion is induced in the frame 30 which, as seen in FIG. 3, has the maximum axis inclined upwardly to the left and the minimum axis inclined upwardly to the right. Where the weights 38 and 40 are together equal to the weight 34 and the throws are identical, the motion will be a straight line upwardly to the left. The amplitude is the sum of the forces generated.

FIG. 4 illustrates another phase relationship between the weights 34, 38 and 40. In this instance, an elliptical path is induced in the frame 30 which has the major axis extending in a horizontal direction in the screen mounting plane. In FIG. 5, the major axis of the motion ellipse is vertically oriented. The most effective orientation for any given material or mixture to be separated may be empirically determined and the timing belt 56 adjusted to accommodate the most efficient operation. The directions of rotation as indicated in FIGS. 3 through 5 as superimposed on the device of FIG. 1 provide more conveyance of material than the reverse.

In operation, this first embodiment arranged as illustrated in FIGS. 1 through 3 receives material to be separated through the inlet manifold 22. The material is distributed onto the screens mounted in the screen mounting plane. With the motor 46 driving the eccentric weights 34, 38 and 40, the material to be screened is moved across the frame 30 in the direction of material travel to the outlet. With the major axis of the vibratory motion inclined in the direction of material travel, a lifting component of the motion assists in separation while an advancing component of the motion moves the material toward the outlet. Through changes in weights or phase angle, motions can be induced which vary along the length of the screen mounting plane. Material separated through the screens drop to the collector pan 26 for discharge through the port 28. Material too large to pass through the screen is discharged at the outlet at one end of the frame 30.

Turning to the embodiment of FIGS. 6 through 8, a first eccentric weight system includes an eccentric weight 70 rotatably mounted within the frame by a hollow cylindrical shaft 72 defining an axis of rotation therethrough. A second eccentric weight system includes an eccentric weight 74 rotatably mounted within the hollow cylindrical shaft 72 about a solid shaft 76 constrained by bearings 78. Thus, the first and second eccentric weight systems include coincident effective axes of eccentric force.

The drive illustrated in FIGS. 6 and 7 includes a first gear wheel 80 fixed to the hollow cylindrical shaft 72 and a second gear wheel 82 fixed to the solid shaft 76. The gear wheels 80 and 82 are axially displaced. Gearing including two gear wheels 84 and 86 couple the gear wheels 80 and 82 together such that the eccentric weights 70 and 74 rotate in opposite directions at a fixed ratio of rotation of unity. One or the other of the gear wheels 84 and 86 or one of the shafts 72 and 76 may provide a pulley or gearing to couple with a motor 46 for rotational drive. The eccentric weights 70 and 74 each include identical eccentric weight elements symmetrically positioned about a center plane parallel to the direction of material travel and normal to the screen mounting plane to effect uniform motion across the screen structure. Again, it is preferred that the coincident axes of the shafts 72 and 76 are located through the center of gravity of the resiliently mounted frame 30.

FIG. 7 illustrates one construction of the drive of FIG. 6. A further bearing 88 is illustrated for rotationally mounting the hollow cylindrical shaft 72 to the frame 30. Additionally, the eccentric weights 70 and 74 are shown to be split and coupled with keyed index plates 90 and 92, respectively. These weight plates may be rotated relative to one another and fixed by the keyed index plates so as to vary the effective eccentricity. In this way, the shape of the motion ellipse may be varied. As the eccentric weights are symmetrical, identical weight plates are to be found at the other end of the shafts 72 and 76.

Another drive for the concentric shafts 72 and 76 is illustrated in FIG. 8. A toothed belt 100 is driven by a motor 102. The belt 100 drives pulleys 104 and 106. The pulley 104 is an idler while the pulley 106 is fixed to the hollow cylindrical shaft 72. A counter-rotating drive pulley 108 is fixed to rotate with the pulley 104. A counter-rotating shaft pulley 110 is coupled with the counter-rotating drive pulley 108 by means of a toothed belt 112. By having the pulleys 104 and 106 of equal diameters and the counter-rotating pulleys 108 and 110 of equal diameter, the shaft pulley 110 will rotate in the opposite direction and at the same speed. The shaft pulley 110 is coupled with the solid shaft 76.

In FIG. 9, the configuration of FIGS. 3, 4 and 5 is repeated but with a second drive system. The belt 56 is applied so that the two outside eccentric weights 38 and 40 forming a second system rotate in opposite directions. By having the same weights and eccentricities and by having the weights running at the same speeds in opposite directions and aligned toward one another along the line between axes of the weights on every revolution, a linear motion component is generated through the center of gravity. This component will bisect the line between axes of the weights 38 and 40 and be perpendicular thereto. To provide for material advancement, the line between the weights 38 and 40 may be tipped relative to the screen plane so that the linear component is inclined in upward motion toward the separator outlet. At the same time, the first weight system creates a circular motion component. The two combined create elliptical motion. Two idler pulleys 114 and 116 provide convenient threading of the belt 56.

Accordingly, versatile vibratory driving systems for a vibratory screen separator are disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A vibratory screen separator comprising a resiliently mounted frame having a screen mounting extending in a first plane and defining a direction of material travel in the first plane;

a first eccentric weight system rotationally mounted to the resiliently mounted frame about a first axis;

a second eccentric weight system rotationally mounted to the resiliently mounted frame about a second axis coincident with the first axis, each of the first and the second eccentric weight systems being symmetrical about a center plane of the resiliently mounted frame that is parallel to the direction of material travel and normal to the first plane;

a drive coupled to the first and second eccentric weight systems, the direction of rotation of the first eccentric weight system being opposite to the direction of rotation of the second eccentric weight system.

2. The vibratory screen separator of claim 1, the drive being coupled with the first and second eccentric weight systems with equal fixed ratios of rotation.

3. The vibratory screen separator of claim 1, the eccentricity of the first eccentric weight system being unequal to the eccentricity of the second eccentric weight system.

4. The vibratory screen separator of claim 1, the first eccentric weight system including a first shaft and two first weights having the same eccentricity fixable relative to the first shaft at a plurality of angular positions.

5. A vibratory screen separator comprising a resiliently mounted frame having a screen mounting extending in a first plane and defining a direction of material travel in the first plane;

a first eccentric weight system rotationally mounted to the resiliently mounted frame about a first axis, the first eccentric weight system including a first shaft and two first weights having the same eccentricity fixable relative to the first shaft at a plurality of angular positions;

a second eccentric weight system rotationally mounted to the resiliently mounted frame about a second axis coincident with the first axis, the second eccentric weight system including a second shaft and two second weights having the same eccentricity fixable relative to the second shaft at a plurality of angular positions, each of the first and the second eccentric weight systems being symmetrical about a center plane of the resiliently mounted frame that is parallel to the direction of material travel and normal to the first plane;

a drive coupled to the first and second eccentric weight systems, the direction of rotation of the first eccentric weight system being opposite to the direction of rotation of the second eccentric weight system.

6. The vibratory screen separator of claim 5, the drive including a first gear wheel fixed to the first shaft, a second gear wheel fixed to the second shaft, an idler gear wheel engaged with the first shaft and a drive gear wheel engaged with the second gear wheel and the idler gear wheel.

7. A vibratory screen separator comprising a resiliently mounted frame having a screen mounting extending in a first plane and defining a direction of material travel in the first plane;

a first eccentric weight system rotationally mounted to the resiliently mounted frame about a first axis;

a second eccentric weight system rotationally mounted to the resiliently mounted frame about a second axis coincident with the first axis, each of the first and the second eccentric weight systems being symmetrical about a center plane of the resiliently mounted frame that is parallel to the direction of material travel and normal to the first plane;

a drive coupled to the first and second eccentric weight systems, the direction of rotation of the first eccentric weight system being opposite to the direction of rotation of the second eccentric weight system, the drive including a toothed pulley, an idler pulley engaging one side of the toothed pulley, a drive pulley engaging the other side of the toothed pulley and coupled with the first eccentric weight system, the idler pulley having a first counter rotating pulley fixed to the idler pulley and a second counter rotating pulley fixed to the second eccentric weight system and coaxial with the drive pulley.

* * * * *